United States Patent

Eybergen

[11] Patent Number: 6,062,484
[45] Date of Patent: May 16, 2000

[54] MODULAR THERMAL EXPANSION VALVE AND CARTRIDGE THEREFOR

[75] Inventor: William N. Eybergen, Windsor, Canada

[73] Assignee: Eaton Corporation, Cleveland, Ohio

[21] Appl. No.: 09/082,338

[22] Filed: May 20, 1998

[51] Int. Cl.[7] .................................................. F25B 41/04
[52] U.S. Cl. ........................................ 236/92 B; 62/225
[58] Field of Search ........................... 62/225; 236/92 B, 236/99 R

[56] References Cited

U.S. PATENT DOCUMENTS

| 4,819,443 | 4/1989 | Watanabe et al. | 236/92 B |
| 4,979,372 | 12/1990 | Tanaka | 236/92 B |
| 5,127,237 | 7/1992 | Sendo et al. | 236/92 B |
| 5,257,737 | 11/1993 | Vestergaard | 236/92 B |
| 5,555,739 | 9/1996 | Kujirai et al. | 62/225 |
| 5,931,377 | 8/1999 | Kang et al. | 236/99 R |

*Primary Examiner*—William E. Tapolcai
*Attorney, Agent, or Firm*—Roger A. Johnston

[57] ABSTRACT

An improved thermally responsive expansion valve for use in controlling flow of refrigerant in a circulating system has a cartridge sub-assembly with a fluid charged diaphragm capsule, an operating rod mechanism, a valve seat and captured valve obturator. A tubular extension with the valve seat is adjustably threaded onto the capsule. The cartridge subassembly may be thermally pre-calibrated before installation in a blind bore in a valve body. During calibration, the tubular extension is rotated to adjust the diaphragm and operating rod mechanism to provide the desired obturator movement from the valve seat at the calibration temperature.

3 Claims, 1 Drawing Sheet

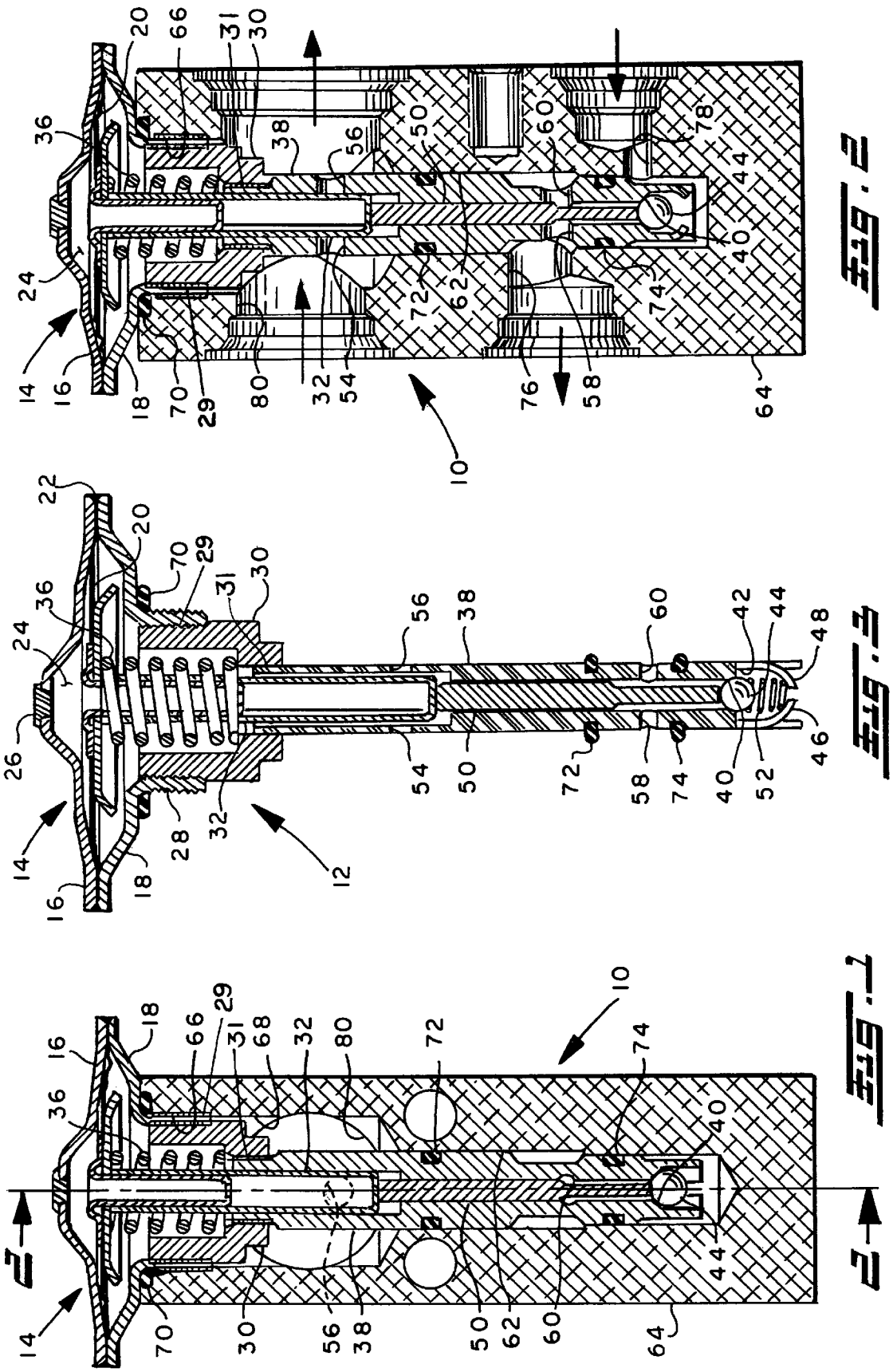

MODULAR THERMAL EXPANSION VALVE AND CARTRIDGE THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to expansion valves of the type employed for controlling flow of refrigerant in refrigeration and air conditioning systems. Typically, in an air conditioning system, such as those employed for automotive passenger compartment cooling, an expansion valve throttles the flow of pressurized liquid refrigerant flowing from the condenser at relatively high pressures to provide relatively low pressure flow to an evaporator for heat absorption and return therefrom to the compressor inlet. In particular, expansion valves employed for controlling flow of liquid refrigerant to an evaporator in an automotive air conditioning system are of the type known as a "block" valve, wherein the valve body or block has a separate return flow passage provided therethrough in which vaporized refrigerant discharged from the evaporator flows to permit heat transfer therewith for control purposes.

Examples of such block type thermal expansion valves for automotive air conditioning use are those shown and described in U.S. Pat. No. 4,542,852, U.S. Pat. No. 5,269,459 and U.S. Pat. No. 5,547,126.

Heretofore, known thermal expansion valves have employed an actuator rod mechanism for moving a valve member and to expose the rod mechanism to the refrigerant flowing in the return passage to the compressor for heat transfer therebetween. It is also known to employ heat transfer through the rod to provide a temperature signal which in turn operates a pressure responsive means connected to the actuator rod mechanism for controlling the function of the expansion valve in response to changes in the temperature of the refrigerant discharging from the evaporator.

It is also known to provide a fluid filled chamber having pressurized fluid therein which acts upon a diaphragm as the pressure responsive means to move the valve actuator rod mechanism. It is also known to have a portion of the rod filled with the pressurized fluid to thereby be in heat transfer relationship with the refrigerant flowing through the return passage to the compressor inlet.

Such known thermal expansion block valves employed for automotive air conditioning applications have required precision machining of surfaces in the block for providing the build up or assembly of the valve on the block and provide accurate controlling of the valving action. Typically, the passages, ports and particularly the valve seat in the block have necessitated costly set up and machining operations from opposite ends of the block and have resulted in relatively high manufacturing costs for valves employed in high volume automotive applications. Furthermore, it has been required to completely assembly the valve components on the block in order to perform calibration and testing of the valve. This has resulted in costly assembly and testing operations and has prevented the detection of defective parts or assembly until the entire valve has been fully assembled.

Furthermore, the construction of known thermal expansion block valves has required expensive machine set ups for controlling the tolerances and location of the surfaces in the block for assembly of the valve components. Known block type thermal expansion valves for automotive air conditioning applications utilize an aluminum block which required that the machining operations be performed prior to application of anodic coating and thus precludes continuous manufacturing operations from the machining of the block to a final assembly and testing of the valve.

It has, therefore, long been desired to provide a way or means of providing a thermally responsive expansive valve for control of refrigerant in a refrigeration or air conditioning system such that the operating components of the valve may be assembled and calibrated prior to final assembly. It has also been desired to provide a thermally responsive expansion valve of the block type in a manner which minimizes the need for tight tolerance control of the location and machining of the valving surfaces in the block and which may be machined in a single set up and assembled in a continuous process.

BRIEF SUMMARY OF THE INVENTION

The present invention provides a thermally responsive refrigerant expansion valve of the block type which is particularly suitable for automotive air conditioning systems. The thermally responsive expansion valve of the present invention utilizes a preassembled and precalibrated cartridge including a fluid charged capsule valve operating rod mechanism and valve obturator and valve seat the cartridge subassembly can be fabricated and calibrated as a separate unit which is then assembled into a blind bore formed in one ported end of the valve block. The thermally responsive expansion valve of the present invention eliminates the need for machining the block and assembly of the components from opposite ends of the block. The thermally responsive expansive valve of the present invention provides a valve which may be calibrated and tested for leakage prior to final assembly and which may be assembled from one side or end of the block.

BRIEF DESCRIPTION OF THE DRAWINGS

FIG. 1 is a cross-section of the assembled thermally responsive expansive valve of the present invention;

FIG. 2 is a section view taken along section indicating lines 2—2 of FIG. 1; and FIG. 3 is a section view of the cartridge including the fluid filled capsule operating rod mechanism and valve obturator for assembly into the block of FIG. 1.

DETAILED DESCRIPTION OF THE INVENTION

Referring to FIGS. 1 through 3, the valve assembly of the present invention is indicated generally at 10 and includes a cartridge subassembly indicated generally at 12 which includes a fluid filled capsule indicated generally at 14 which has an upper shell 16 and a lower shell 18 which are joined together at their periphery with a thin diaphragm 20 disposed therebetween generally in sandwiched arrangement. The shell 16, 18 and diaphragm 20 are secured peripherally and sealed by any suitable expedient as for example weldment as denoted by reference numeral 22 in FIG. 3.

The upper shell 16 forms a chamber 24 above the diaphragm 20 which is charged with a suitable fluid, as for example, refrigerant and is sealed at charging by plug 26. The lower shell 18 has a hub portion 28 which is threaded externally and internally with an annular cap or adjustment member 30 threadedly engaging the internal threads in hub 28, it being understood that the cap 30 is rotatable for axial adjustment in the hub 28. As shown in FIGS. 1 through 3, cap 30 threadedly engages the interior of the hub 28 with threads 29.

Diaphragm 20 has a hollow tubular member 32 attached at its upper end preferably centrally thereto with the interior hollow of the member 32 communicating with the fluid charged chamber 24 and the opposite or lower end closed. A stiffening or backing plate 34 is provided about the central region of the undersurface of diaphragm 20; and, the upper end of a spring 36 is registered against the undersurface of plate 34 with the lower end of spring 36 registered on the bottom of a counterbore 31 formed in the cap 30. Rotation of cap 30 in threads 29 serves to adjust the preload of spring 36 on diaphragm 20 as desired.

A tubular extension member 38 has an end thereof attached to the cap 30 with the closed end of tubular member 32 extending downwardly within the extension 38. As shown in FIGS. 1 through 3, member 30 has its upper end threadedly engaging at 31 the bottom of cap 30.

Extension 38 has an annular valve seat 40 formed at the bottom of a bore 42 formed in the lower end of the extension 38 with a valve obturator in the form of a spherical member 44 disposed on the valve seat 40. The extension 38 has a pair of deformable tabs 46, 48 formed in the wall of counterbore 42 with a compression spring 52 captured by the tabs which are deformed to the position shown in FIG. 3 to detain the lower end of the spring 52 with the upper end thereof registered against and biasing the valve member 44 upwardly against the valve seat 40.

An operating rod 50 is received in the tubular extension member 38 with the upper end thereof contacting the closed end of the tubular extension 32 and the lower end of rod 50 contacting the spherical valve member 44.

The extension 38 is cross ported at ports 54, 56 in the upper region thereof, to permit refrigerant fluid, in a manner as will hereinafter be described to enter the interior of the extension and to be in heat transfer relationship with the tubular member 32 which is filled with the fluid in chamber 24.

The member 38 is also cross ported in the lower region thereof as denoted by reference numerals 58, 60 to permit refrigerant flowing over the valve seat 40, upon opening thereof, to flow to the interior of extension 38 and outwardly through the ports 58, 60.

It will be understood that the upper portion of the operating rod 50 has a dimensionally precision or controlled diameter so as to closely interfit the inner diameter of extension member 38 to permit only a very small leakage of fluid around the operating rod and into the region of the cross ports 54, 56.

In order to calibrate the cartridge subassembly 12, the capsule 14 is placed in a suitable fixture (not shown) and the capsule exposed to fluid at a preselected temperature for calibration. Fluid pressure is supplied in an isolated manner in a fixture (not shown) to the lower end of the extension 38. The cap 30 is then rotated with respect to lower shell 28 to adjust the preload in spring 36 and the tubular extension 32 rotated to adjust contact against operating rod 50 to open valve 44 to produce a desired flow through outlet ports 58, 60. Once calibrated, the cap 30 then may be secured rotationally with respect to lower shell 28 by a suitable expedient, as for example, an anaerobic adhesive or staking.

Once the cartridge subassembly 12 has been calibrated, it is removed from the unshown calibration fixture and is inserted into blind bore 62 formed in an end or side of the valve block 64.

The external threads of hub 28 of the capsule 14 engage threads 66 provided in a counterbore or enlarged diameter portion 68 formed in the upper end of the bore 62 in block 64. An annular seal ring 70 is provided in an annular groove in the upper end of the block 64 for effecting a seal between the lower shell 18 and the end of the block 64.

An annular seal 72 is provided in an annular groove on the extension member 38 with the groove disposed between cross ports 54, 56 and cross ports 58, 60 for sealing between the extension 38 and the bore 62 formed in the block. An additional annular seal ring 74 is provided in an annular groove formed in the extension 38 and is disposed between the cross ports 58, 60 and the lower end of the extension 38 and seals between the extension 38 and the bore 62 of the block 64. Thus, the ports 58, 60 are isolated between the seal rings 72, 74 and communicate exclusively with an outlet passage or port 76 formed in the block. A high pressure inlet passage or port 78 is formed in the block 64 and is located below the seal ring 74 such that port 78 communicates exclusively with the movable valve member side of the valve seat 40.

Block 64 also has a through passage 80 formed therein spaced from the passages 76, 78 and disposed to communicate exclusively with cross ports 54, 56. Through passage 80 is isolated from outlet port 58 by annular seal ring 72.

Thus, in operation as the flow through passage 80 and ports 54, 56 effects heat transfer through the wall of tubular member 32 and to the fluid in the interior of tubular extension 32 and chamber 24. The expansion and contraction of the fluid in the chamber 24 causes movement of diaphragm 20, rod 50 and the valve member 44 which controls flow between the high pressure inlet of the valve and the outlet passage 76.

It will be understood that the valve assembly 10 is typically connected in a refrigeration or air conditioning system with the refrigerant flow from the condenser entering ports 78 and the reduced pressure expanded flow in outlet passage 76 connected to the inlet of an evaporator (not shown) with the evaporator discharge passed through passage 80 for return to the inlet of the compressor (not shown).

The present invention thus provides a unique construction and method of assembly for a refrigerant expansion valve having a cartridge subassembly including the thermally response fluid filled capsule and operating rod and high pressure valve member preassembled as a unit and which may be precalibrated prior to installation in a valve receptacle or body.

The cartridge subassembly has a threaded extension on the thermally responsive capsule, adjustment of which provides for setting the preload and opening point of the valve at a predetermined calibration temperature; and, the cartridge requires no further calibration upon assembly into the valve body. The cartridge subassembly eliminates the need for precision machining and location of a valve seat and tight tolerance control in machining the valve body. The blind bore in the block for receiving the cartridge is machined and threaded from one end of the block requiring only a single machine set-up; and, the need for machining of the opposite block end is eliminated. The present invention thus provides an easy to manufacture and assemble reliable and reduced cost expansion valve for use in refrigeration or air conditioning systems and is particularly suitable for high volume mass production of automotive air conditioning systems.

Although the invention has hereinabove been described with respect to the illustrated embodiments, it will be understood that the invention is capable of modification and variation and is limited only by the following claims.

I claim:

1. A thermally responsive cartridge for use in a refrigerant expansion valve comprising:
   (a) a fluid filled capsule including a pressure responsive moveable wall and including a hollow tubular extension member depending from said capsule;
   (b) a hollow plunger moveably received in said capsule and having an end thereof connected to said wall for movement therewith;
   (c) said extension member defining an annular valve seat distal said moveable wall wherein said extension member is adjustably attached to said capsule;
   (d) an obturator disposed for movement with respect to said valve seat, said extension member including structure operative to cage said obturator in position over said valve seat; and,
   (e) an operating member contacting said plunger and said obturator for effecting movement of said obturator in response to movement of said wall upon expansion and contraction of said fluid in said capsule, wherein said extension member includes a fluid flow port communicating said valve seat with the exterior thereof and said capsule is adapted for attachment to a valve block."

2. A thermally responsive cartridge for use in a refrigerant expansion valve comprising:
   (a) a fluid filled capsule including a pressure responsive moveable wall and including a hollow tubular extension member depending from said capsule;
   (b) a hollow plunger moveably received in said capsule and having an end thereof connected to said wall for movement therewith;
   (c) said extension member defining an annular valve seat distal said moveable wall wherein said extension member is threadedly connected to said capsule for adjustment with respect thereto;
   (d) an obturator disposed for movement with respect to said valve seat, said extension member including structure operative to cage said obturator in position over said valve seat; and,
   (e) an operating member contacting said plunger and said obturator for effecting movement of said obturator in response to movement of said wall upon expansion and contraction of said fluid in said capsule, wherein said extension member includes a fluid flow port communicating said valve seat with the exterior thereof and said capsule is adapted for attachment to a valve block."

3. A method of making a thermally responsive expansion valve comprising:
   (a) forming a body having an inlet port, an outlet port and a through passage spaced from said inlet and outlet ports;
   (b) forming a blind bore in said body and communicating said bore with said inlet, outlet and through passage;
   (c) pre-calibrating a thermally responsive valving cartridge having a fluid filled capsule and diaphragm operated valve and inserting said cartridge in said blind bore and sealing said inlet port from said outlet port and sealing said outlet port from said through passage; and,
   (d) retaining said cartridge in said bore and threadedly engaging said capsule in said body."

* * * * *